United States Patent
Fang et al.

(10) Patent No.: US 10,823,309 B2
(45) Date of Patent: Nov. 3, 2020

(54) RETRACTABLE HANDLE ASSEMBLY, VALVE USING THE SAME AND INTERMEDIATE BULK CONTAINER

(71) Applicant: SHANGHAI HONGYAN RETURNABLE TRANSIT PACKAGINGS CO., LTD, Shanghai (CN)

(72) Inventors: Zhengwei Fang, Shanghai (CN); Zuocheng Qian, Shanghai (CN); Kai Gong, Shanghai (CN); Qingxin Liao, Shanghai (CN)

(73) Assignee: SHANGHAI HONGYAN RETURNABLE TRANSIT PACKAGINGS CO. LTD, Shanghai (CN)

( * ) Notice: Subject to any disclaimer, the term of this patent is extended or adjusted under 35 U.S.C. 154(b) by 0 days.

(21) Appl. No.: 14/762,371

(22) PCT Filed: Jan. 20, 2014

(86) PCT No.: PCT/CN2014/070899
§ 371 (c)(1),
(2) Date: Jul. 21, 2015

(87) PCT Pub. No.: WO2014/111055
PCT Pub. Date: Jul. 24, 2014

(65) Prior Publication Data
US 2015/0369391 A1    Dec. 24, 2015

(30) Foreign Application Priority Data
Jan. 21, 2013  (CN) .......................... 2013 1 0022210

(51) Int. Cl.
*F16K 31/60* (2006.01)
*F16K 35/00* (2006.01)
(Continued)

(52) U.S. Cl.
CPC .............. *F16K 31/602* (2013.01); *F16K 1/22* (2013.01); *F16K 5/06* (2013.01); *F16K 35/00* (2013.01); *F16K 35/04* (2013.01); *B65D 77/0466* (2013.01)

(58) Field of Classification Search
CPC .......... F16K 31/602; F16K 31/22; F16K 5/06; F16K 35/04; F16K 35/00; F16K 35/025;
(Continued)

(56) References Cited

U.S. PATENT DOCUMENTS 1,351,391 A * 8/1920 McGahey ............. B60T 17/043
251/98
1,395,678 A   11/1921 Jones
(Continued)

FOREIGN PATENT DOCUMENTS

CN    102285487    12/2011
CN    103075564     5/2013
(Continued)

OTHER PUBLICATIONS

International Search Report for application No. PCT/CN2014/070899, dated Apr. 18, 2014 (4 pages).

*Primary Examiner* — Craig J Price
*Assistant Examiner* — Andrew J Rost
(74) *Attorney, Agent, or Firm* — Hamre, Schumann, Mueller & Larson, P.C.

(57) ABSTRACT

Retractable handle assembly used in a valve of an Intermediate bulk container (IBC) includes a valve body, a valve core, and a valve stem. The valve stem is used to drive the valve core to move so as to open/close the valve. The handle of the handle assembly is connected to the valve stem and can be rotated around the central rotating axis of the valve stem. When the valve needs to be opened/closed, the handle is rotated around the central rotating axis to a deployed state (Continued)

to open/close the valve. The handle is rotated around the central rotating axis to a retracted state so as to reduce the space occupied by the valve for the valve to be welded to the liner bag or installed to IBC. The handle can be switched between a deployed state and a retracted state.

4 Claims, 8 Drawing Sheets

(51) Int. Cl.
    *F16K 1/22*     (2006.01)
    *F16K 5/06*     (2006.01)
    *F16K 35/04*     (2006.01)
    *B65D 77/04*     (2006.01)

(58) Field of Classification Search
    CPC ......... F16K 35/02; F16K 31/607; B25G 1/06;
                           B65D 47/20; B65D 77/067
    USPC ...... 251/101, 98, 107, 104, 144, 90; 16/429,
                                                  16/900
    See application file for complete search history.

(56) References Cited

U.S. PATENT DOCUMENTS

| | | | | | |
|---|---|---|---|---|---|
| 1,583,142 | A | * | 5/1926 | Hanrahan | F16K 31/602 |
| | | | | | 251/98 |
| 1,696,283 | A | * | 12/1928 | Pratt | B60T 17/043 |
| | | | | | 251/355 |
| 5,219,147 | A | * | 6/1993 | Fultz | F16K 35/06 |
| | | | | | 251/90 |
| 5,400,473 | A | * | 3/1995 | Delman | E05F 11/16 |
| | | | | | 16/429 |
| 5,887,850 | A | * | 3/1999 | Ruffalo | B60T 17/043 |
| | | | | | 16/110.1 |
| 5,944,300 | A | * | 8/1999 | Gillard | B67D 3/043 |
| | | | | | 251/187 |
| 6,050,545 | A | | 4/2000 | Stolzman | |
| 6,325,355 | B1 | * | 12/2001 | Johnson | B60T 17/043 |
| | | | | | 251/243 |
| 2011/0120575 | A1 | * | 5/2011 | Schutz | B65D 77/0466 |
| | | | | | 137/511 |

FOREIGN PATENT DOCUMENTS

| | | |
|---|---|---|
| CN | 203082342 | 7/2013 |
| GB | 340447 | 1/1931 |

\* cited by examiner

RETRACTABLE HANDLE ASSEMBLY, VALVE USING THE SAME AND INTERMEDIATE BULK CONTAINER

FIELD

The present invention relates to IBC, in particular to a handle assembly of a valve of IBC.

BACKGROUND

Intermediate bulk containers (IBC) are packaging reusable containers widely used in food, biochemical, pharmaceutical, chemical and other industries. IBC can be reused many times and have distinct advantages for filling, storage and transportation. Compared with drums, IBC containers can save 35% of the storage space, have dimensions conforming to ISO standards. IBCs are suitable for aseptic filling and have a compact structure. Thus, IBCs are convenient for bulk storage with safety and efficiency, and thus widely used in the transportation, packaging, storage process of liquids, granules, flakes and materials of other forms.

Currently, there are three main specifications, including 820L, 1000L and 1250L, for IBC. Typically, the IBC comprises a plastic liner, a filling port, a discharge valve, side plates, a base and a cover. Most liquids or particles stored in IBC are pharmaceutical intermediates, beverage concentrates, food additives and even dangerous materials, etc., which are not only expensive but also related with health and safety. Therefore, protection functions used to prevent unauthorized opening or discharging in use are needed.

Existing valves used in IBC are typically welded to liner bags. However, due to the limitations of valve welding position, valve handles will interfere with the welding electrode. Thus, removable handles are generally provided. When welding the valve, the handle must be removed, and when the valve has been installed to IBC, the handle is still in a detached state, due to the space limitations of the valve mouth. When there is a need to open the valve, the handle is installed and then used to open and close the valve. In this way, the handle may be lost and the valve cannot be opened/closed. Moreover, the assembly of the handle is complicated, inefficient and laborious. Alternatively, the handle is not removable or retractable after being installed to the valve, which leads to a large space occupied for the valve. The package volume for the valve is large, and the valve handle is susceptible to be damaged.

SUMMARY

The object of the present invention is to provide a retractable handle assembly that is connected to the valve of an IBC and can be switched between a deployed state and a retracted state, wherein after the handle assembly is retracted, the assembling process of the valve will not be affected, and the valve will not be easily damaged and occupies a smaller space.

In order to achieve the above intention, the present invention provides a retractable handle assembly, wherein the retractable handle assembly may be used in a valve of IBC. The valve may comprise a valve body, a valve core, and a valve stem, wherein the valve stem being used to drive the valve core to move so as to open/close the valve. The handle of the handle assembly is connected to the valve stem and is able to be rotated around a central rotating axis of the valve stem, such that when the valve needs to be opened/closed, the handle will be rotated around the central rotating axis to a deployed state to open/close the valve. The handle will be rotated around the central rotating axis to a retracted state for the valve to be welded to the liner bag or installed to the IBC. The retractable handle achieves a switch between two working conditions.

In one preferred embodiment, the handle assembly may comprise a handle and a handle pin. The handle is provided with integrated rotating portion and gripping portion, wherein the center of the rotating portion is provided with a handle pin hole, and the bottom of the rotating portion is provided with recesses and an elastic projection. The valve stem is provided with a rotating hole and a position-limiting rib, wherein the handle pin is inserted into the rotating hole and the handle, so that the handle will be rotated around the handle pin, and thereby being switchable between the deployed state and the retracted state. The elastic projection and the recesses are engaged with the position-limiting rib, so that the handle will be maintained in the deployed state or in the retracted state.

In another preferred embodiment, the handle is constituted of a gripping portion, and a rotating column and a positioning column provided on one end of the handle. The head of the valve stem is provided with a rotating hole and a positioning-limiting slot, wherein the rotating column of the handle is inserted into the rotating hole, meanwhile the positioning column is inserted into the positioning-limiting slot, so that the handle will be able to be rotated around a central rotating axis of the rotating hole, and thereby being able to be switched between the deployed state and the retracted state.

The present invention further provides another retractable handle assembly, wherein the retractable handle assembly is used in a valve of IBC. The valve may comprise a valve body, a valve core, and a valve stem, wherein the handle of the handle assembly is connected to the valve stem and is able to be rotated around a central rotating axis of the valve stem. The handle is provided with an anti-misoperation device, so that when the handle is in a retracted state, the handle can not be deployed, and thereby preventing the valve from being opened/closed accidentally. When the valve needs to be opened/closed, the handle is rotated around the central rotating axis to a deployed state to open/close the valve. Or, the handle will be rotated around the central rotating axis to a retracted state for the valve to be welded to the liner bag or installed to IBC. The retractable handle achieves a switch between two working conditions.

Preferably, the anti-misoperation device comprises an anti-misoperation projection provided on the handle and an anti-misoperation slot provided on the valve cover 11 of the valve, so that when the valve cover 11 is closed, the valve can not be opened/closed due to the engagement between the anti-misoperation projection and the anti-misoperation slot. The handle can be deployed and thereby opening/closing the valve only after the valve cover 11 is removed.

Preferably, the handle assembly comprises a handle and a handle pin. The handle is provided with integrated rotating portion and gripping portion, wherein the center of the rotating portion is provided with a handle pin hole, and the bottom of the rotating portion is provided with recesses and an elastic projection. The anti-misoperation projection is provided at the tip of the gripping portion. The valve stem is provided with a rotating hole and a position-limiting rib, wherein the handle pin is inserted into the rotating hole and the handle, so that the handle will be rotated around the handle pin, and thereby being switchable between the deployed state and the retracted state. The elastic projection and the recesses are engaged with the position-limiting rib, so that the handle will be maintained in the deployed state or in the retracted state.

Preferably, the handle is constituted of a gripping portion, and a rotating column and a positioning column provided on one end of the handle. The anti-misoperation projection is provided at the tip of the gripping portion. The head of the valve stem is provided with a rotating hole and a positioning-limiting slot, wherein the rotating column of the handle is inserted into the rotating hole, meanwhile the positioning column is inserted into the positioning-limiting slot, so that the handle will be able to be rotated around the central rotating axis of the rotating hole, and thereby being able to be switched between the deployed state and the retracted state.

The present invention also provide a valve, the valve is used in IBC, the valve comprises a valve body, a valve core, and a valve stem, wherein the valve is provided with the retractable handle assembly described above.

Preferably, the valve is a ball valve or a butterfly valve.

The present invention further provides an intermediate bulk container (IBC), wherein the IBC comprises a liner, side plates, a base, a cover and a discharge valve. The discharge valve is the valve described above.

As compared to the existing valve handle used in IBC, the handle of the retractable handle assembly of the present invention will not be easily lost since the handle is rotatably installed on the valve stem. Additionally, the handle can be switched between a deployed state and a retracted state. When the handle is in a retracted state, the handle occupies a quite small space, and thus, the handle will not produce bad influence while welding the valve to the IBC. Moreover, after the handle is retracted, it will not be easily damaged.

DRAWINGS

DESCRIPTIONS

Figure 1:
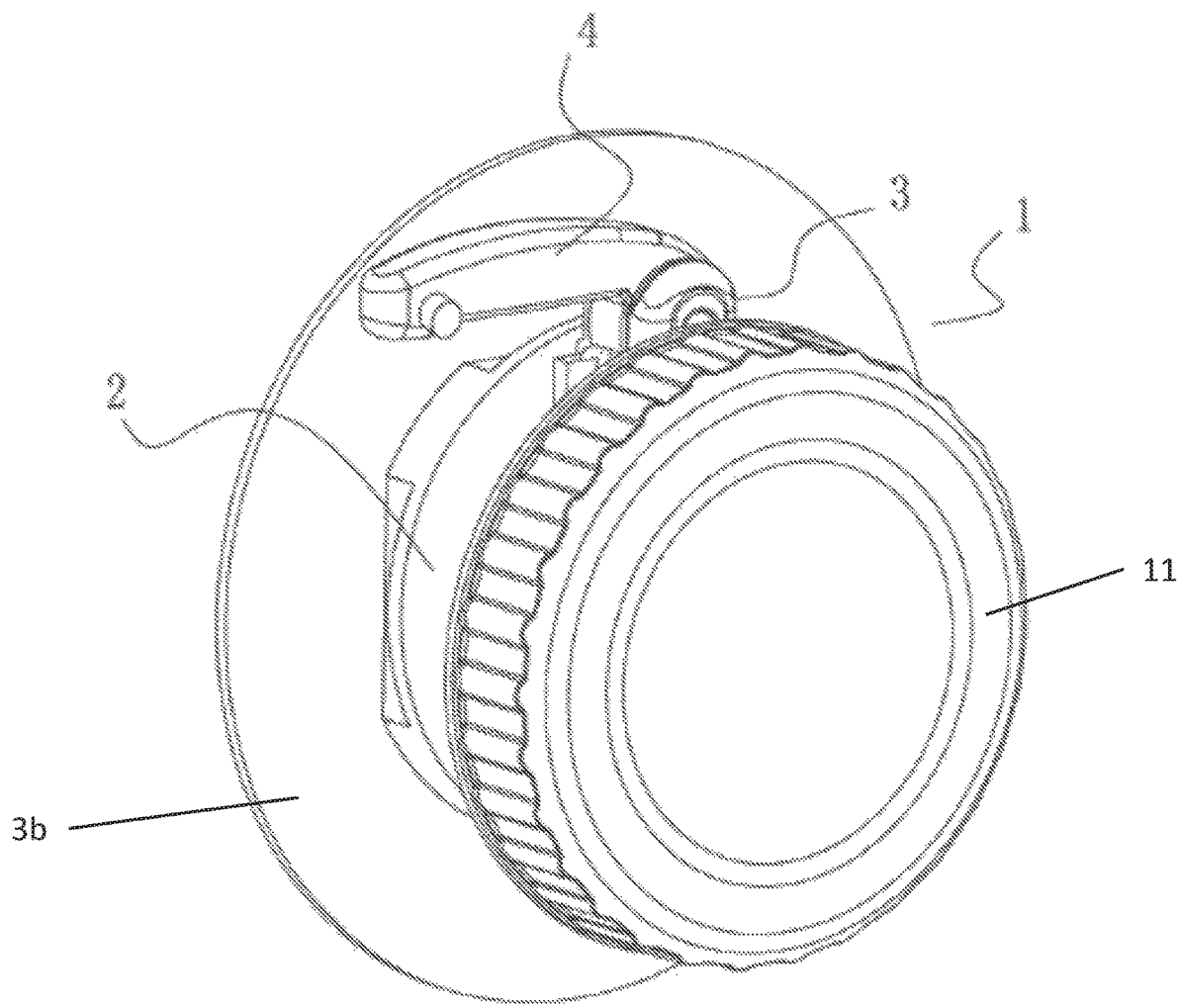
FIG. 1 illustrates a valve used for IBC and provided with a retractable handle assembly according to the present invention.

Hereinafter, preferred embodiment of the present invention will be described in detail with reference to the drawings, so that the purposes, features and advantages of the present invention will be more clearly understood. It should be understood that the embodiments shown in the drawings are not to limit the scope of the invention, but merely to illustrate the true spirit of the technical solutions of the present invention.

Figure 10A:
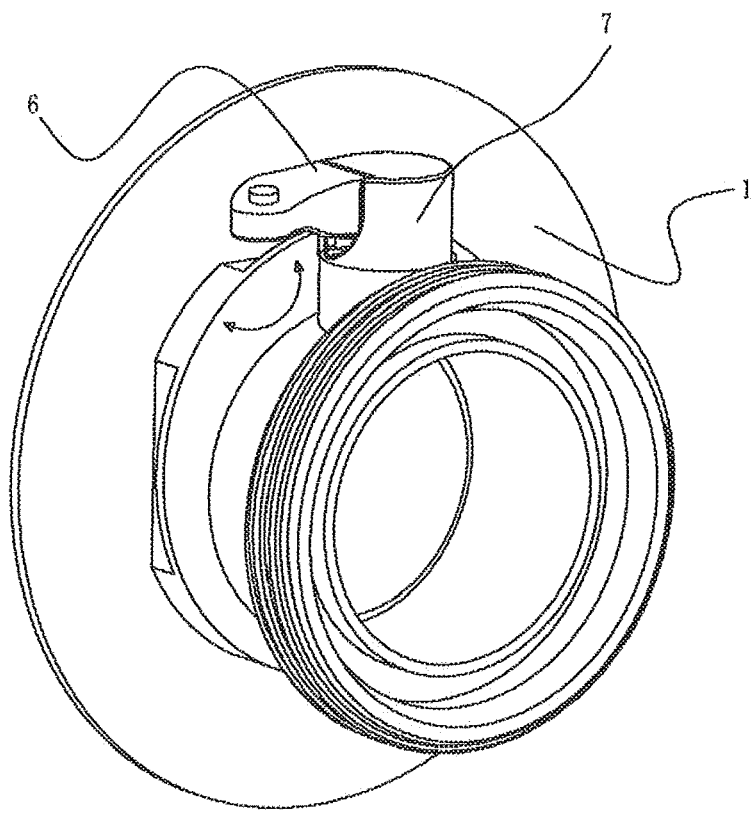
FIG. 10a illustrates a perspective view of a valve using the retractable handle assembly according to the second embodiment of the present invention, wherein the handle is in a deployed state.
Figure 10B:
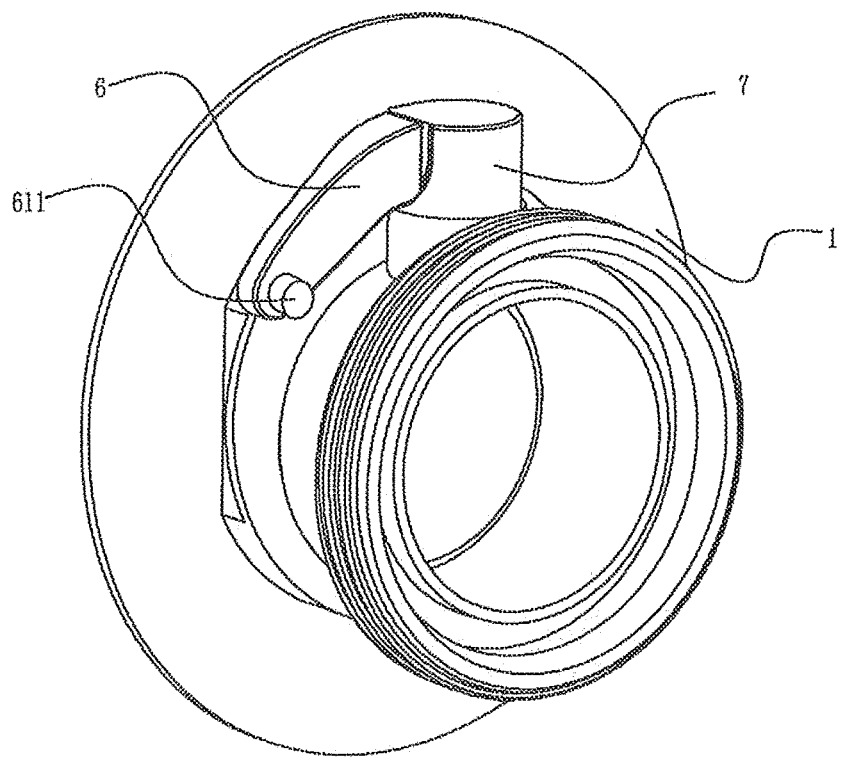
FIG. 10b illustrates a perspective view of a valve using the retractable handle assembly according to the second embodiment of the present invention, wherein the handle is in a retracted state.

FIG. 1 illustrates a valve used for IBC provided with a retractable handle assembly according to the present invention. IBC (not shown) generally comprises a base, four side plates, a cover and a liner bag. The liner bag is typically used to contain liquid materials, such as pharmaceutical intermediates, beverage concentrates, food additives and even dangerous materials, and so on. The discharge port of the liner bag is typically provided with a valve, which is connected to the liner bag of IBC by welding, so as to release the liquid in the liner bag. The valve can be of various types of valves, such as ball valves, butterfly valves, and so on. As shown in FIG. 1 and FIGS. 10a and 10b, the valve 1 generally comprises a valve body 2, a valve core 3a, a flange 3b and a valve stem 3, so that when rotating the valve stem, the valve core can be opened and/or closed, thereby opening/closing the valve.

The handle 4 is rotatably connected to the valve stem through a handle pin, so that the handle can be rotated around the handle pin. When in use, the handle is rotated around the center axis of the handle pin to an active state, and then the valve core is driven by the valve stem to open/close the valve. While not in use, the handle is rotated around the center axis of the handle pin to an inactive state, so as to reduce space occupied by the valve and prevent the handle and the valve from being damaged.

Figure 2:
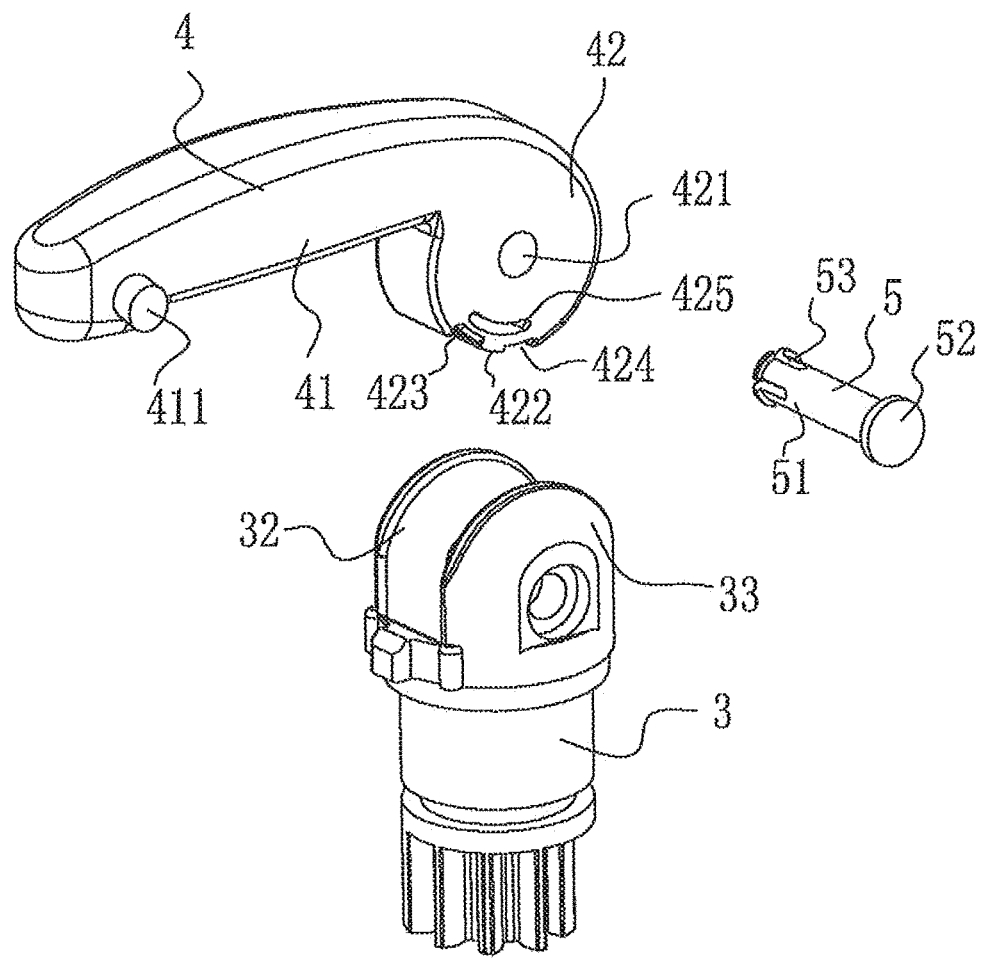
FIG. 2 illustrates an exploded perspective view of the retractable handle assembly according to a first embodiment of the present invention.

FIG. 2 illustrates an exploded perspective view of the retractable handle assembly according to a first embodiment of the present invention. As shown in FIG. 2, the handle assembly comprises: a handle 4, a handle pin 5, and a fitting structure provided on the valve stem. Specifically, the handle 4 is provided with a gripping portion 41 and a rotating portion 42, wherein the shape of the gripping portion 41 is designed so as to be engaged with the corresponding portion of the valve body of the valve contacting the retracted handle, so that after the handle is retracted, the handle occupies a space as small as possible. The center of the rotating portion is provided with a handle pin hole 421. The bottom of the rotating portion is provided with an elastic projection 422 extending along the axial direction of the handle pin hole 421. Both sides of the elastic projections 422 are provided with recesses 423 and 424 extending along the axial direction of the handle pin hole 421. A through slot 425 having an elongated cross section is further provided at a position of the rotating portion 42 corresponding to the elastic projection 422, so as to provide a space for the elastic deformation of the elastic projection 422, thereby increasing the elasticity of the elastic projection 422.

Figure 7:
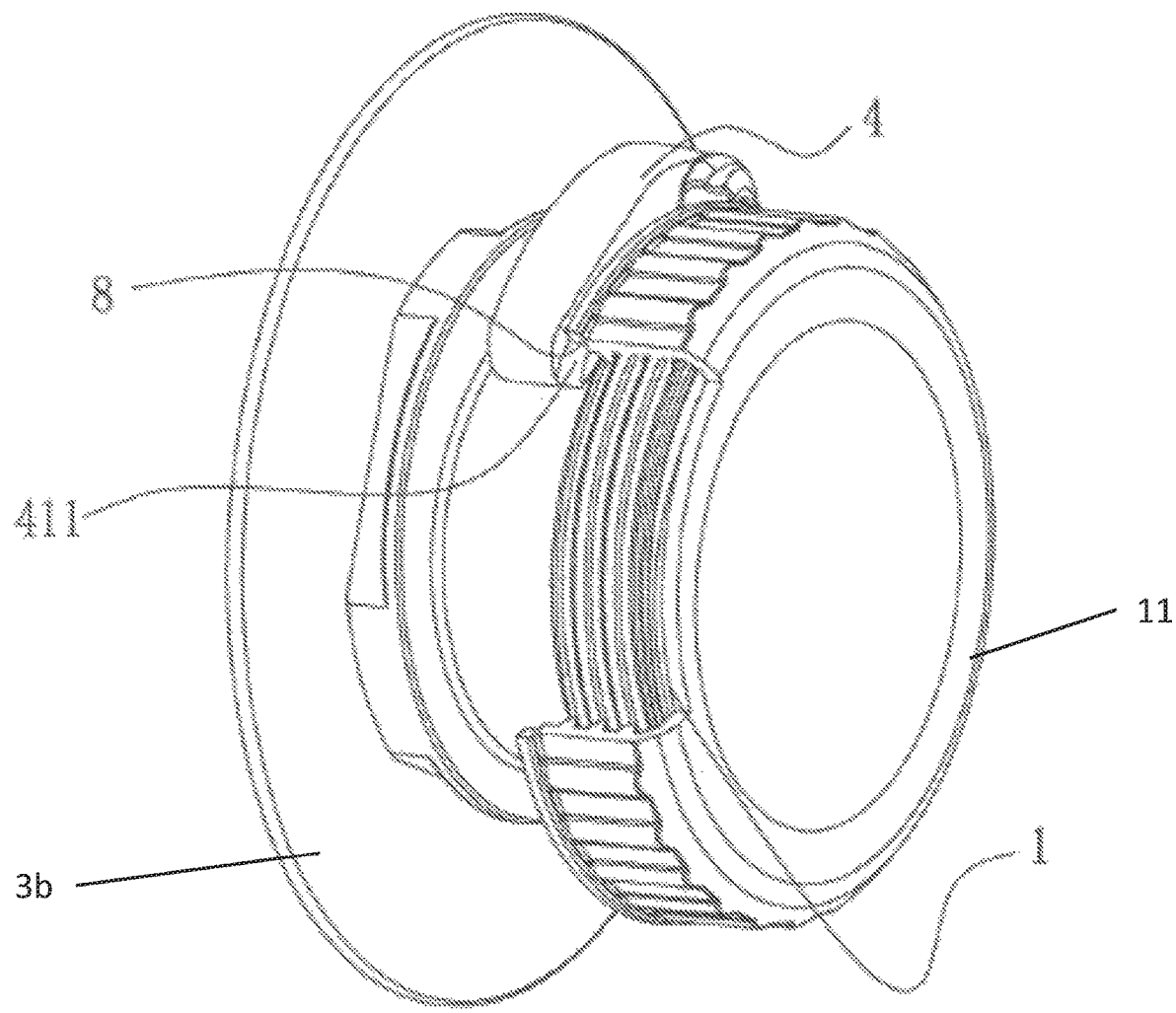
FIG. 7 illustrates a perspective view of the valve, wherein the handle is in the retracted state and the valve is partially cut away to show the anti-misoperation structure.

An anti-misoperation projection 411 is further provided at the tip of the gripping portion 41 of the handle 4 (or provided at other positions of the handle). Accordingly, an anti-misoperation slot 8 is provided on the valve cover 11 of the valve (as shown in FIG. 7). When the handle is in a retracted state, during the process of assembling the valve cover 11, the anti-misoperation slot of the valve cover 11 will be gradually hung on the anti-misoperation projection 411 on the handle. After the valve cover 11 has been assembled, the anti-misoperation projection is locked, so that the handle can not be rotated at the moment, and the valve can not be opened or closed. When the valve cover 11 is removed, the handle can be deployed and then the valve can be opened/closed. Thus, when the valve cover 11 is not used, the handle will be prevented from being operated accidentally, otherwise the valve can be opened accidentally, the liquids in the valve will be ejected, which may hurt people and cause property loss.

Preferably, the handle pin 5 has a body 51. One end of the handle pin 5 is provided with a handle pin head 5 with a larger diameter than that of the body. The other end of the handle pin is provided with an elastic buckle 53, wherein the front portion of the elastic buckle is notched, and the buckle will be deformed when being squeezed. When there is free space, the deformed buckle will restore elastically. Therefore, the handle pin 5 will not be easily disengaged from the handle pin hole 421 after it is inserted into the handle pin hole 421.

Preferably, the handle 4 is made of light plastic materials.

Figure 3:
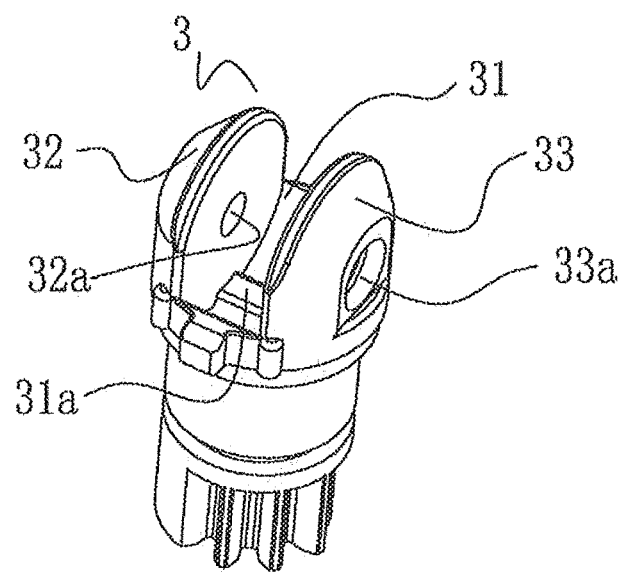
FIG. 3 illustrates a perspective view of a corresponding valve stem of the retractable handle assembly according to the first embodiment of the present invention.

FIG. 3 illustrates a perspective view of a corresponding valve stem of the retractable handle assembly according to the first embodiment of the present invention. As shown in FIG. 3, the head of the valve stem 3 is provided with a groove 31, and both side walls of the groove 31 are provided with lugs 32 and 33. Lugs 32 and 33 are respectively provided with rotating holes 32a and 33a, which have a same central rotating axis. It should be noted that lugs 32 and 33 should be strengthened to some extent to resist the forces from the handle during the process of the valve being opened/closed (i.e., the process of the handle being rotated), thereby preventing the lugs from being damaged and achieving synchronized movement of the handle and the valve stem.

Further, the bottom wall of the groove 31 is provided with a position-limiting rib 31a extending along the central rotating axial direction. The position-limiting rib 31a is used to be engaged with the elastic projection 422 and the recesses 423, 424 on the handle, so that the handle can be respectively maintained in a retracted state and a deployed state.

The bottom of the valve stem 3 is provided with structures engaged with the valve core of the valve. Said structures can be any existing corresponding structures on the valve stem of the valve, which will not be described in detail herein.

During assembly, the rotating portion 42 of the handle 4 is installed into the groove 31 of the valve stem 3. The handle pin hole 421 of the handle and the rotating holes 32a, 33a of the valve stem 3 are aligned. The handle pin 5 successively passes through the valve stem 3 and the handle 4. When the handle pin 5 is passing through the valve stem 3 and the handle 4, the buckle 53 on the handle pin 5 will be snapped on the outer surface of the lugs of the valve stem 3, so that the handle pin will be integrated with the valve stem and the handle without falling off.

Figure 4:
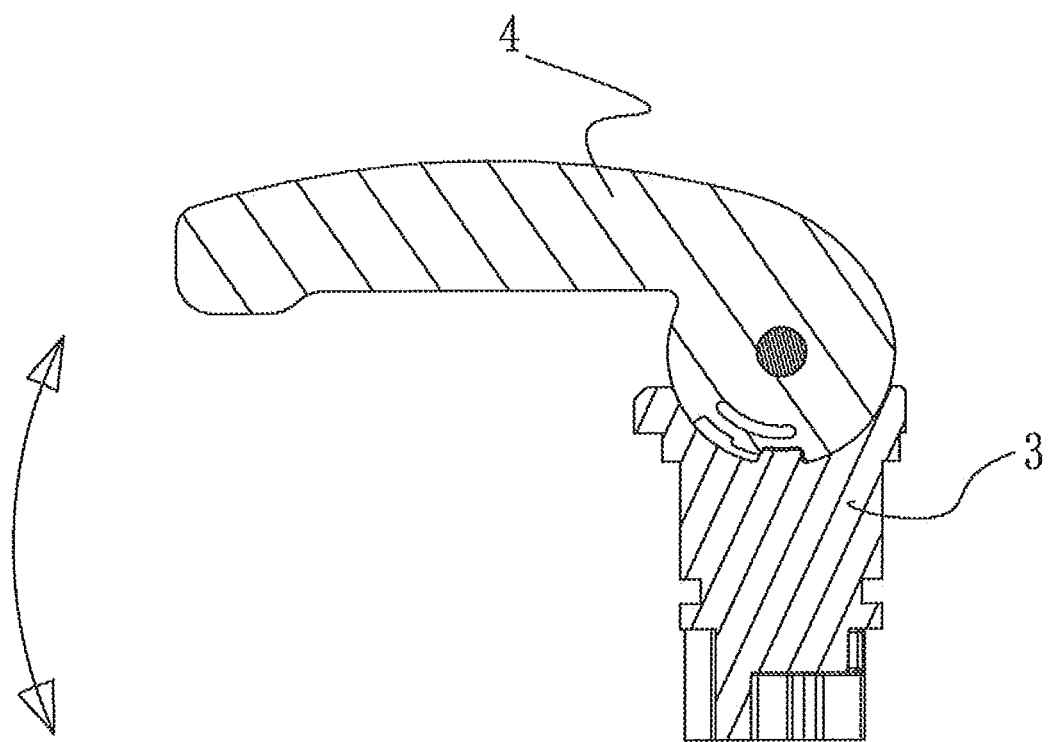
FIG. 4 illustrates a sectional view of the retractable handle assembly according to the first embodiment of the present invention in a deployed state.

When the valve needs to be opened, as shown in FIG. 4, the handle 4 is rotated (clockwise, as shown in FIG. 4) by an angle around the axis of the handle pin as a central rotating axis, so that the handle is in an active state. Meanwhile, the elastic projection 422 and the recess 424 of the handle 4 are engaged with the position-limiting rib 31a, so that the handle is in a relatively stable elastic position-limiting point.

Figure 5:
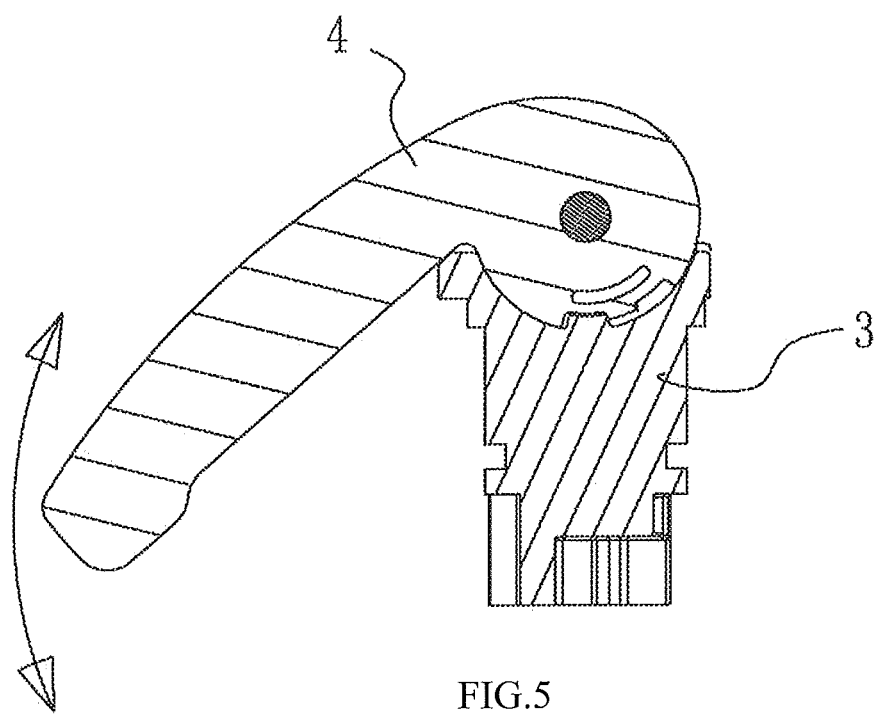
FIG. 5 illustrates a sectional view of the retractable handle assembly according to the first embodiment of the present invention in a retracted state.

When there is no need to open the valve, as shown in FIG. 5, the handle 4 is rotated (counterclockwise, as shown in FIG. 5) by an angle around the axis of the handle pin as a central rotating axis, so that the handle is in a retracted state (an inactive state). Meanwhile, the elastic projection 422 and the recess 423 of the handle are engaged with the position-limiting rib 31a of the valve stem 3, so that the handle is in another relatively stable elastic position-limiting point.

Figure 6A:
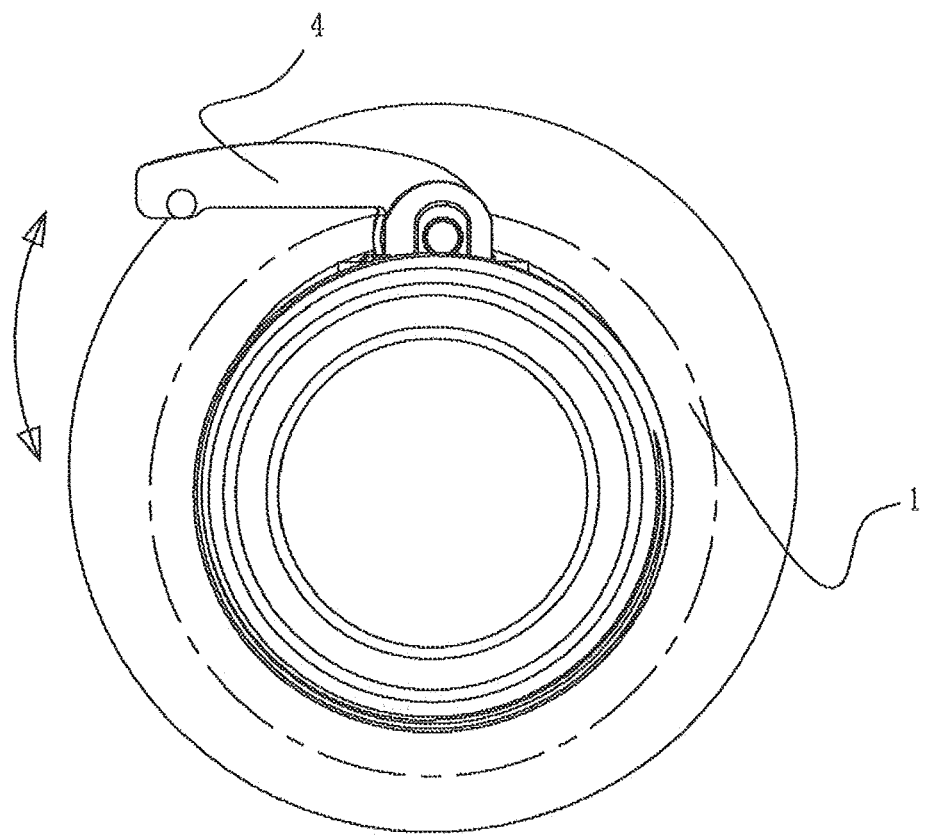
FIG. 6a illustrates a front view of the valve of the retractable handle assembly according to the first embodiment of the present invention, wherein the handle is in the deployed state.

FIG. 6a schematically illustrates a structure of handle assembly of the present invention assembled to the valve and in the deployed state. As shown, when there is a need to open or close the valve, the handle can be deployed in order to operate the valves to be opened or closed.

Figure 6B:
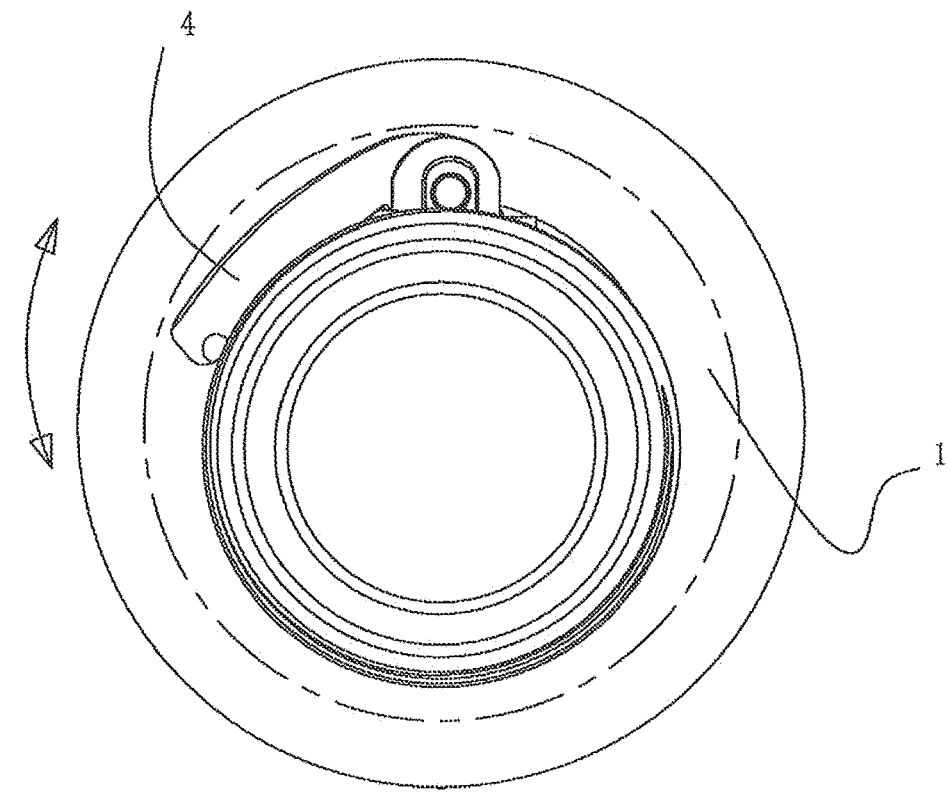
FIG. 6b illustrates a front view of the valve of the retractable handle assembly according to the first embodiment of the present invention, wherein the handle is in the retracted state.

FIG. 6b schematically illustrates a structure of the handle assembly assembled to the valve and in a retracted state. When the valve is not in use or during the valve is welded to the liner bag, the handle can be retracted. When the handle is retracted and abuts on the valve body, the space occupied is very small, thereby the process of welding the valve to the liner bag will not be affected, and the process of installing the valve to IBC will not be affected, neither.

Figure 8:
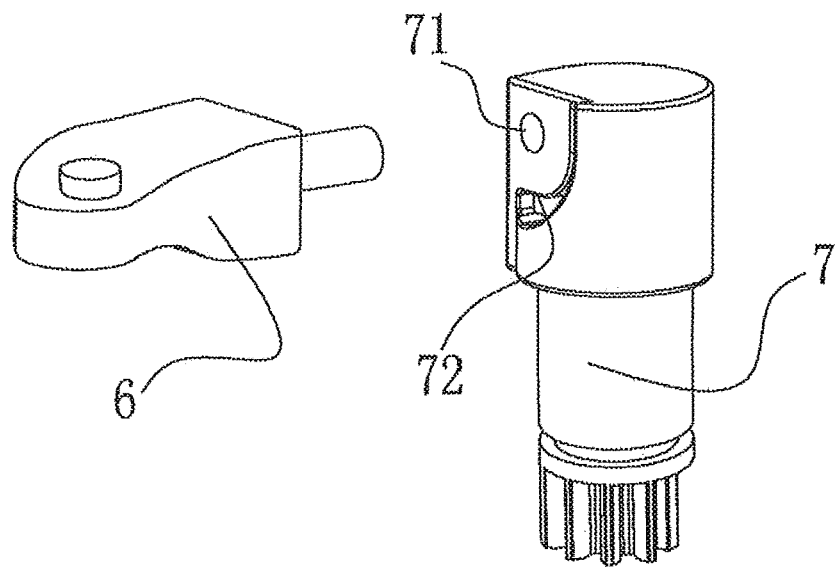
FIG. 8 illustrates an exploded perspective view of the retractable handle assembly according to the second embodiment of the present invention.
Figure 9A:
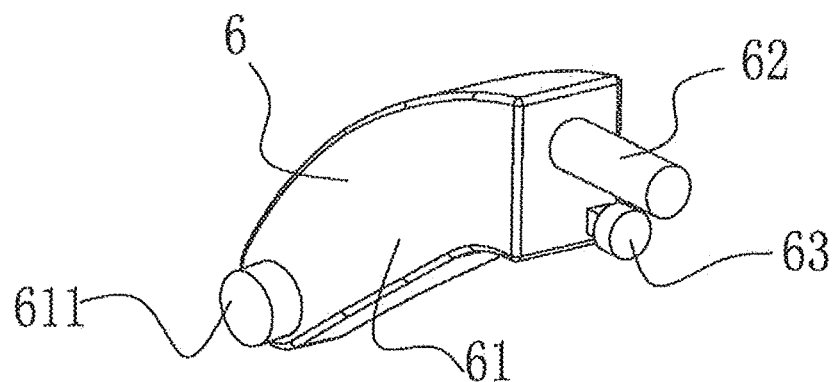
FIGS. 9a and 9b illustrate respectively a perspective view and a front view of the handle of the retractable handle assembly according to the second embodiment of the present invention.
Figure 9B:
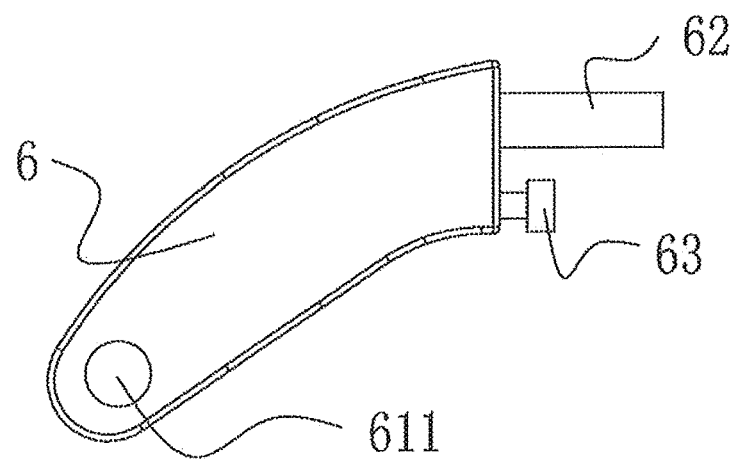

FIG. 8 illustrates an exploded perspective view of a retractable handle assembly of according to a second embodiment of the present invention. FIGS. 9a and 9b illustrate a perspective view and a front view of the handle 6, respectively. As shown in FIGS. 9a and 9b, the handle 6 is constituted of a gripping portion 61, as well as a rotating column 62 and a positioning column 63 provided on one end of the handle. The gripping portion 61 is shaped such that when the handle 6 is in a retracted state (an inactive state), the handle is complied with the corresponding portion of the valve body of the valve contacting the handle, thereby reducing the volume occupied by the handle after the handle is retracted. The head 63b of the positioning column 63 has a cross-sectional area lager than that of the root 63a of the positioning column 63. The head of the valve stem 7 is provided with a rotating hole 71 and a positioning-limiting slot 72. The rotating column 62 of the handle can be inserted into the rotating hole 71, and meanwhile the positioning column 63 is inserted into the positioning-limiting slot 72, so that the handle 6 can be rotated around the central rotating axis of the rotating hole 71 to be switched between the deployed state and the retracted state. The positioning-limiting slot 72 is shaped to ensure that when the positioning column 63 is inserted therethrough, the positioning column 63 can slide along the positioning-limiting slot 72 without disengaging from the positioning-limiting slot 72.

Figure 11:
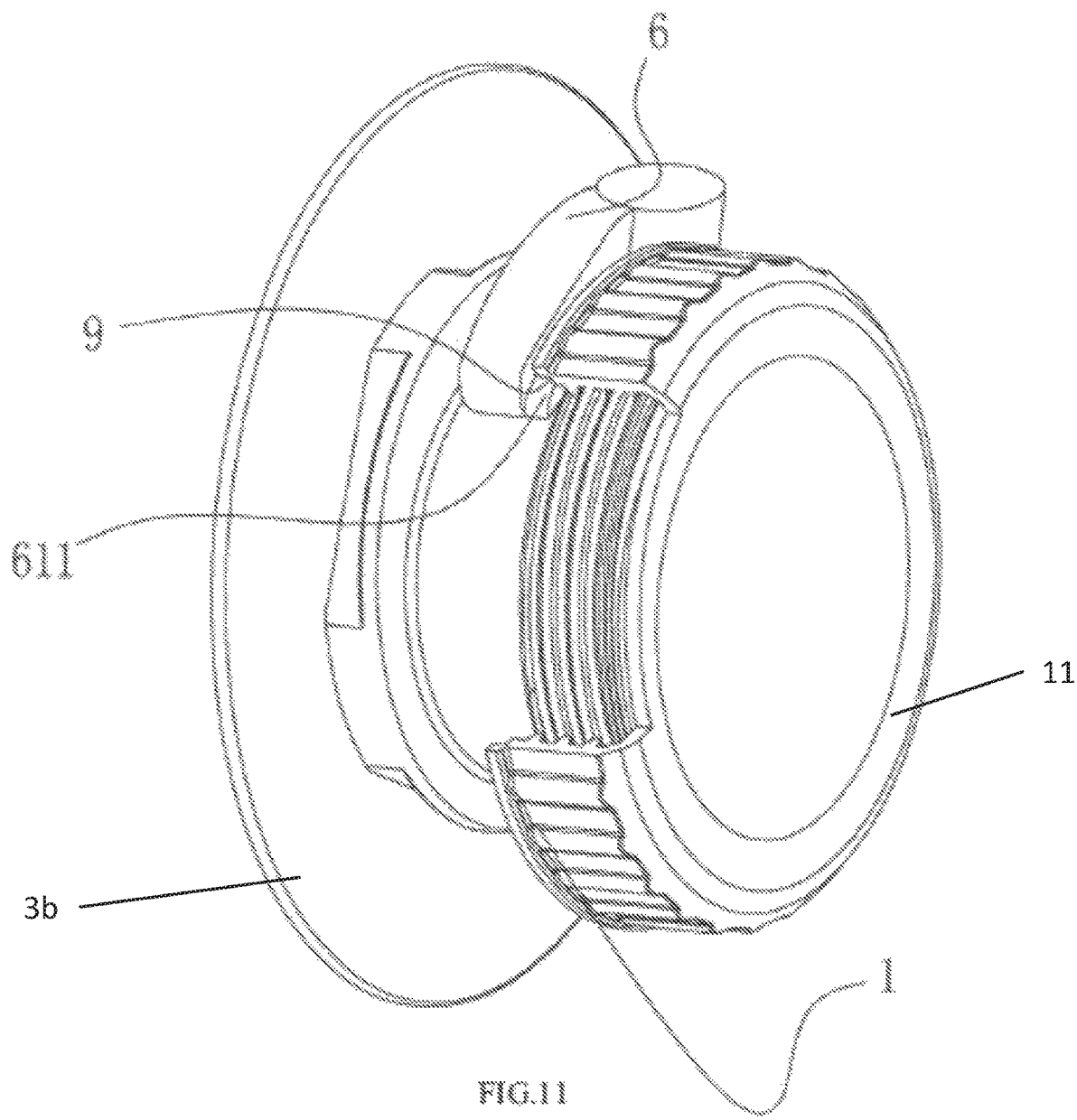
FIG. 11 illustrates a perspective view of the valve, wherein the handle is in a retracted state and the valve is partially cut away to show the anti-misoperation structure.

An anti-misoperation projection 611 is further provided at the tip of the gripping portion 61 of the handle 6 (alternatively, it may be provided at other positions of the handle). Accordingly, an anti-misoperation slot 9 is provided on the valve cover 11 of the valve (as shown in FIG. 11). When the handle is in a retracted state, the anti-misoperation slot of the valve cover 11 will be gradually hung on the anti-misoperation projection 611 of the handle during the process of closing the valve cover 11. When the valve cover 11 has been assembled, the anti-misoperation projection is locked, the handle can not be rotated at the moment, and the valve can not be opened/closed. The handle can be deployed so that the valve can be opened/closed only after the valve cover 11 is removed. Thus, when the valve is not used, the handle will be prevented from being operated accidentally which will prevent the liquids in the valve from being ejected and hurt people, cause property loss when accidentally open the valve.

FIGS. 10a and 10b illustrate perspective views of a valve using the retractable handle assembly according to the second embodiment of the present invention, respectively, wherein the handle is in a deployed state in FIG. 10a and in a retracted state in FIG. 10b. As shown in FIGS. 10a and 10b, when the handle 6 is assembled to the valve stem 7, the handle 6 can be rotated around the rotating column 62. The handle can be rotated counterclockwise by about 90° to be deployed. The handle can be rotated clockwise by about 90° to be retracted.

As compared to the existing valve handle used in IBC, the handle of the retractable handle assembly of the present invention will not be easily lost since the handle is rotatably installed on the valve stem. Additionally, the handle can be switched between a deployed state and a retracted state. When the handle is in a retracted state, the handle occupies a quite small space, and thus, the handle will not produce bad influence while welding the valve to the IBC. Moreover, after the handle is retracted, it will not be easily damaged.

Preferred embodiments of the present invention has been described in detail hereinbefore, but it is to be understood that, after reading the above teachings of the present invention, those skilled in the art may make various modifications or amendments to the present invention. These equivalent forms also fall into the scope limited by appended claims of the present application.

The invention claimed is:

1. A valve,
comprising a valve body, a valve stem, a flange that is connected to the valve body, and a handle assembly, the valve stem being used to open/close the valve,
wherein the handle assembly comprises a handle that includes a gripping portion and a rotating portion, wherein the rotating portion is installed into a groove of the valve stem by a handle pin passing through a handle pin hole and a rotating hole of the valve stem which are aligned to each other, so that the rotating portion is connected to the valve stem and is able to be rotated around a central rotating axis of the valve stem, such that when the valve needs to be opened/closed, the handle is rotated around the central rotating axis of the valve stem to a deployed state, where the stem can be driven to rotate by rotating the handle around a longitudinal axis of the stem so as to open/close the valve, or the handle is rotated around the central rotating axis to a retracted state for the valve to be welded to a liner bag or installed to an IBC, wherein the central rotating axis extends in a direction perpendicular to the valve stem and the longitudinal axis extends in an extending direction of the valve stem;
when the handle is in the retracted state, a part of the gripping portion located closer to the free end of the gripping portion than the rotating portion is configured to abut the valve body and be located within a perimeter of the flange so that a process of welding the valve to the liner bag or installing the valve to the IBC is not obstructed by the handle;
the handle achieves a switch between two working conditions.

2. The assembly according to claim 1, wherein the rotating portion and gripping portion are integrated, and the handle assembly further comprises: the handle pin,
wherein the center of the integrated rotating portion includes the handle pin hole, the bottom of the rotating portion includes recesses and an elastic projection, and the recesses are located at two sides of the elastic projection;
the valve stem includes the rotating hole and a position-limiting rib;
the handle pin is inserted into the rotating hole and the handle, so that the handle is rotated around the handle pin, and thereby being switchable between the deployed state and the retracted state, and
the elastic projection and the recesses are engaged with the position-limiting rib, so that the handle is maintained in the deployed state or in the retracted state.

3. A valve,
comprising a valve body, a valve stem, a flange that is connected to the valve body, and a handle assembly,
wherein the handle assembly includes a handle that includes a gripping portion and a rotating portion, wherein the rotating portion is installed into a groove of the valve stem by a handle pin passing through a handle pin hole and a rotating hole of the valve stem which are aligned to each other, so that the rotating portion is connected to the valve stem and is able to be rotated around a central rotating axis of the valve stem;
the handle includes an anti-misoperation device comprising an anti-misoperation projection provided on the handle and an anti-misoperation slot provided on a valve cover of the valve, and when the handle is in a retracted state, engagement between the anti-misoperation projection and the anti-misoperation slot prevents the handle from being deployed, thereby preventing the valve from being opened/closed accidently;
when the valve needs to be opened/closed, the handle is rotated around the central rotating axis to be a deployed state, where the stem can be driven to rotate by rotating the handle around a longitudinal axis of the stem so as to open/close the valve; or, the handle is rotated around the central rotating axis to a retracted state for the valve to be welded to a liner bag or installed to an IBC, wherein the central rotating axis extends in a direction perpendicular to the valve stem and the longitudinal axis extends in an extending direction of the valve stem;
when the handle is in the retracted state, a part of the gripping portion located closer to a free end of the gripping portion than the rotating portion is configured to abut the valve body and be located within a perimeter of the flange so that a process of welding the valve to the liner bag or installing the valve to the IBC is not obstructed by the handle;
the handle achieves a switch between two working conditions.

4. The assembly according to claim 3, wherein the rotation portion and the gripping portion are integrated and the handle assembly further comprises: the handle pin,
wherein the center of the rotating portion includes the handle pin hole, and the bottom of the rotating portion includes recesses and an elastic projection;
the anti-misoperation projection is disposed at the tip of the gripping portion;
the valve stem includes the rotating hole and a position-limiting rib;

the handle pin is inserted into the rotating hole and the handle, so that the handle is rotated around the handle pin, and thereby being switchable between the deployed state and the retracted state; and the elastic projection and the recesses are engaged with the position-limiting rib, so that the handle is maintained in the deployed state or in the retracted state.

\* \* \* \* \*